United States Patent
Driscoll et al.

(10) Patent No.: US 6,357,934 B1
(45) Date of Patent: Mar. 19, 2002

(54) OPTICAL FIBER BOOT FOR A CONNECTOR THAT PROVIDES ANTI-SNAGGING AND POLARITY IDENTIFICATION

(75) Inventors: Elizabeth J. Driscoll, Atlanta; Norman Roger Lampert, Norcross, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/492,606

(22) Filed: Jan. 27, 2000

(51) Int. Cl.[7] .................................................. G02B 6/36
(52) U.S. Cl. .............................. 385/86; 385/59; 385/87
(58) Field of Search ............................... 385/59, 86, 87

(56) References Cited

U.S. PATENT DOCUMENTS

| | | | |
|---|---|---|---|
| 5,461,690 A | 10/1995 | Lampert | 385/100 |
| 5,462,457 A | 10/1995 | Lampert | 439/736 |
| 5,481,634 A * | 1/1996 | Anderson et al. | |
| 5,538,438 A | 7/1996 | Orlando | 439/344 |
| 5,579,425 A | 11/1996 | Lampert et al. | 385/59 |
| 5,638,474 A | 6/1997 | Lampert et al. | 385/78 |
| 5,719,977 A | 2/1998 | Lampert et al. | 385/60 |
| 6,024,498 A * | 2/2000 | Carlisle et al. | |
| 6,250,817 B1 * | 6/2001 | Lampert et al. | |

* cited by examiner

Primary Examiner—Hung N. Ngo
(74) Attorney, Agent, or Firm—Thomas, Kayden, Horstemeyer & Risley, LLP

(57) ABSTRACT

A connector boot for attachment to a flanged BTW-LC connector has extending at an angle therefrom a trigger member. The trigger on the boot acts as an anti-snag device and makes removal of the connector easier. The boot has a bore extending therethrough having an undercut portion for gripping the connector flange, and at least one key in the bore for mating with slots in the flange of the connector for preventing the boot and trigger from turning relative to the connector. In an embodiment of the invention, a second boot parallel to the first boot is joined thereto by a web, and a trigger member extends from the web at an angle to the boots.

12 Claims, 8 Drawing Sheets

OPTICAL FIBER BOOT FOR A CONNECTOR THAT PROVIDES ANTI-SNAGGING AND POLARITY IDENTIFICATION

FIELD OF THE INVENTION

The present invention relates to optical fiber connectors and, more particularly, to a buffer adapter, also known as the boot, of an optical fiber connector which provides the connector with anti-snagging characteristics and enables the polarity of an optical fiber cable terminated by the connector to be ascertained.

BACKGROUND OF THE INVENTION

In networks and communication equipment that utilize a high count of optical fibers, such as with a dense wavelength division multiplexer (DWDM), it is frequently a nuisance and time consuming to de-tangle the optical connectors for desirable proper order and illustration, and to ensure DWDM operation, it is important to ensure that the 40 output fibers can also be organized, for example, in order of increased wavelengths, and detangled without damage to the fibers. An increasingly used connector for the purpose of determining fibers on DWDMs is known as the behind-the-wall (BTW) version of the LC connector. This small-form-factor-connector (SFFC) is an optical connector, such as is shown in U.S. Pat. No. 5,719,977 which discloses a BTW optical fiber connector for terminating a cable containing a buffered optical fiber. Each optical fiber is held within a fiber-holding assembly comprising a ferrule and a spring-loaded base member. The fiber-holding assemblies are contained within a common housing that is formed to include a flexible molded plastic latching arm member for interlocking with a mating receptacle or adapter. In high-density applications it is possible to have the latch "fish-hook" other connectors which become difficult to separate and organize.

Similarly, it can be important that when only a pair of transmit and receive optical fibers are to be connected to another pair of transmit and receive optical fibers, the correct optical fibers of each of the pairs are connected together in a duplex format, or optically coupled at their ends. Otherwise, an end of a transmit optical fiber of one pair may be connected to an end of a receive optical fiber of the other pair, which, for obvious reasons, is unacceptable. Properly orienting the optical fibers in this duplex manner ensures that the optical fibers are connected with the proper polarity.

Duplex optical connectors have been utilized in the communications industry to couple two simplex optical fibers together in a duplex arrangement to allow both optical fibers to be simultaneously connected to ports located on communication equipment or to an adapter that connects pairs of optical fibers together. For example, U.S. Pat. No. 4,787,706 discloses a duplex optical fiber connector for terminating a cable containing a pair of buffered optical fibers. The optical fibers are held within fiber-holding assemblies which are contained within a common housing that is formed to include two flexible molded plastic side arm members for interlocking with a mating receptacle. The housing includes details that can be used to ensure that when the optical fiber connector is connected with another optical fiber connector, the connection is made with the properly polarity.

U.S. Pat. No. 5,579,425 (hereinafter the '425 patent) also discloses an optical fiber duplex connector which is constructed by joining together a pair of simplex connectors with a plastic clip. The plastic clip has information thereon, such as the letters A and B, that may be utilized by a user to identify the correct polarization of the duplex connector with respect to an adapter (not shown) into which it is plugged.

Although the plastic clip disclosed in the '425 patent is suitable for use with the type of simplex connectors shown, which are normally connected to the front side of a connector receptacle or adapter, this clip is generally not suitable for use with behind-the-wall (BTW) connectors. BTW connectors which typically use buffered fibers are connected on the back side, commonly referred to as the junior side, of the receptacle or adapter where there is typically very little room. The confined area dictates that the simplex connectors and the boots associated therewith generally be shorter in length than the boots of the cables that are used with the simplex connectors in front side mounting configurations.

On the front side of the connector receptacle or adapter, there is generally plenty of space for the length of the connector which usually is for jumper cordage and the boot, which is also referred to as a cable support, and hence is not an issue. Therefore, the plastic clip disclosed in '425 patent, which connects to the housing of the connectors is suitable for use in this type of environment since the lengths of the housings normally are sufficiently long to accommodate connection with the clip at locations near the back ends of the housings. However, this generally is not true with respect to connectors used in BTW configurations.

It is important that the simplex or duplex orientation is maintained, i.e, each connector not be allowed to rotate on fiber axis, so that the trigger on the boot is in the proper orientation to interact with the latch. Internal keys added to the boot that fit into existing key-slots in the extender cap accomplish this. These key-slots are provided for inspection of proper orientation of the extender cap in the plug housing.

In BTW mounting configurations, the connectors that terminate the ends of the receive and transmit optical fibers must be connected to the receive and transmit ports located in the junior side of the receptacle or adapter. Therefore, the receive and transmit optical fibers must be correctly polarized on the junior side of the housing in the same manner in which the receive and transmit optical fibers must be correctly polarized on the front side of the receptacle or adapter. However, currently there is no aid for assisting a user or technician in determining the polarity of the optical fibers connected on the junior side. Therefore, once the transmit and receive optical fibers have been connected to the ports on the junior side, if a user removes one or both of the optical fibers from their respective ports, the user must somehow keep track of which simplex connector is to be connected to which port in order to ensure that the connectors are properly polarized when they are re-connected to the transmit and receive ports.

It would be desirable to provide a duplex boot that converts two simplex connectors into a duplex connector for use in case where there is very little room to work with the connectors and/or in cases where the housings of the connectors are too short to enable the housings to be coupled together to form a duplex connector. For example, once the connector has been inserted into an associated adapter or receptacle, most of the body of the connector is contained within the adapter or receptacle and is generally of insufficient length to enable a duplex yoke to be attached thereto for the purpose of clipping two of the connectors together to form a duplex connector.

Accordingly, a need exists for simplex and duplex boots that are capable of providing an anti-snag mechanism that prevents the simplex or duplex connectors from fish-hooking when the connectors are being removed from a connection location, and a means to prevent rotation of the connector on the fiber axis. Additionally, a need exists to join two simplex connectors together to form a duplex connector, which is suitable for use with connectors used in BTW configurations, and which helps a user to determine the polarity of the connectors easily.

SUMMARY OF THE INVENTION

The present invention is an anti-snag boot that attaches to the extender cap of an optical fiber BTW simplex connector to provide the connector with anti-snagging characteristics and/or to enable the polarity of an optical fiber cable terminated by the connector to be ascertained. The device generally is a boot having internal keys that are adapted to be received in the key-slots of the extender cap and prevent rotation of the connector within the boot of an optical fiber simplex or duplex connectors. The boot has a trigger thereon that is in contact with the latch of the simplex connector when the simplex connector is held in the clip body. When a user depresses the trigger, the trigger depresses the latch and causes the simplex connector to be decoupled from an adapter or receptacle. The trigger prevents the latch from snagging on objects, or "fish-hooking", when the simplex connector is being moved.

In accordance with a first embodiment, the boot is adapted to receive and grip the outer surface of the extender cap of a single simplex connector. A generally cylindrical bore is formed in the boot and the inner surface of the bore contains keys which are adapted to interact with existing key-slots of the extender caps. A cable can be passed through the boot prior to assembly of the connector. The boot is aligned and attached to a simplex connector, and then the trigger is available when it is desired to couple or decouple the connector from the receptacle or adapter. The boot has a trigger thereon that is in contact with the latch of the simplex connector when the simplex connector is held by the boot. The trigger allows a user to decouple the connector from an adapter or receptacle and provides the connector with the aforementioned anti-snagging feature.

In accordance with another embodiment, the device is a duplex boot that comprises a trigger that is adapted to receive and interact with the latch of the connector housing, that can also contain a web to create a duplex boot from a pair of simplex connectors both to hold the simplex connectors in close spatial proximity to one another to thereby form a duplex connector. The trigger and web are made integral with two or more boots to form a unitary structure. Slots are formed in the extender cap which interact with internal keys provided in the boots to provide an anti-rotation feature. During assembly of the connectors, cables can be passed through the boots so they can be later attached to (a pair of) simplex connectors when the simplex connectors are coupled to or decoupled from a receptacle or adapter. The duplex boot has markings thereon, which preferably are located on the trigger, that enable the polarity of the cables held in the connectors to be easily ascertained.

These and other features and advantages of the present invention will become apparent from the following description, drawings and claims.

DETAILED DESCRIPTION

Figure 1:
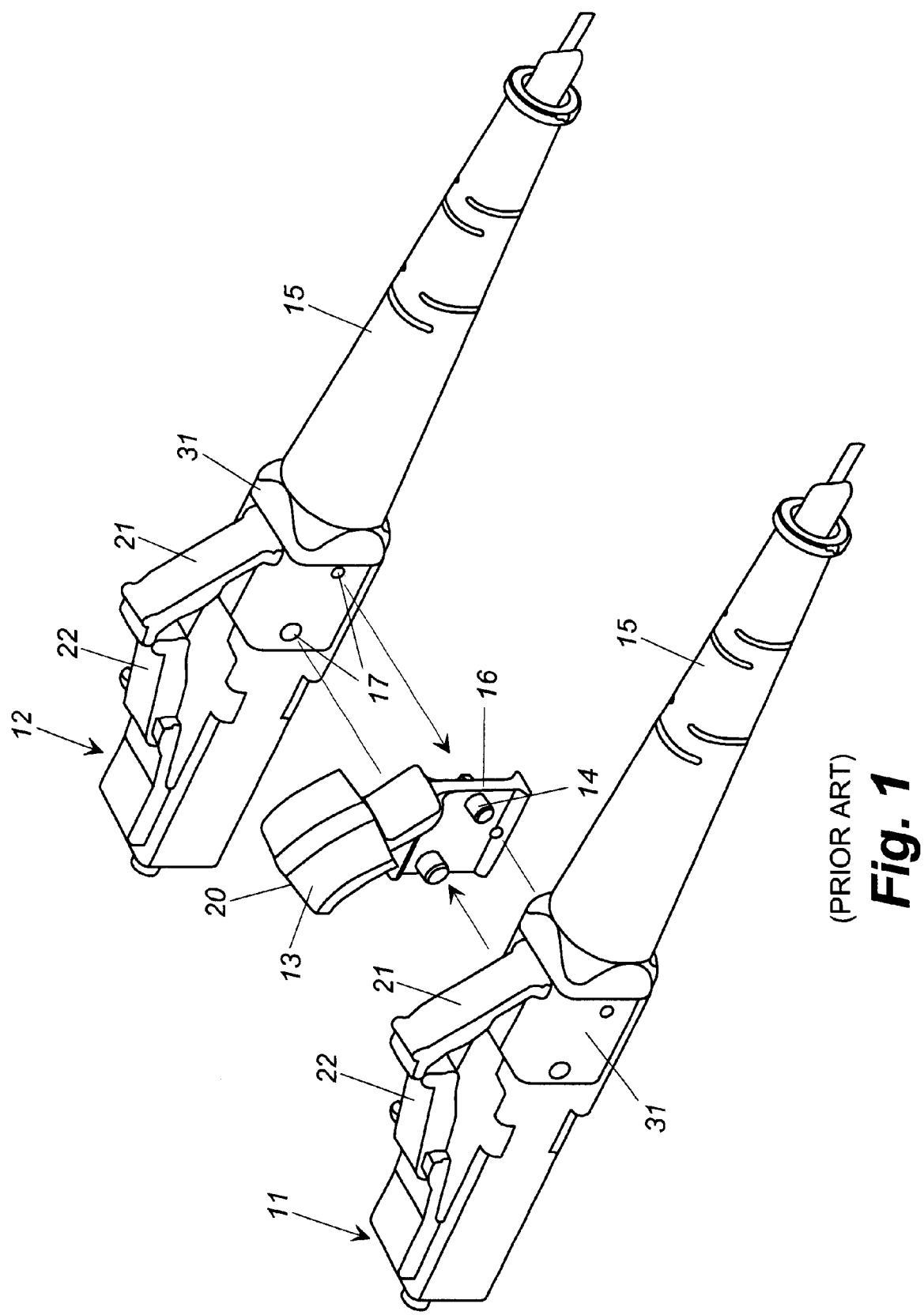
FIG. 1 is a perspective view of a prior arrangement for converting a pair of simplex connectors to a duplex connector.

In FIG. 1 there is shown the arrangement of two simplex connectors 11 and 12 with the adapter clip 13 for creating a duplex connector, as disclosed in the previously discussed U.S. Pat. No. 5,579,425 (hereinafter the '425 patent). The duplex connector is constructed by joining simplex connectors 11 and 12 equipped with elongated boots 15 with plastic clip 13 by means of pins 14 projecting from a planar portion 16 of clip 13 which fit into holes 17 in the sides of each of connectors 11 and 12. Clip 13 is equipped with a trigger 20 which actuates trigger 21 which, in turn, actuate latches 22. As previously pointed out, clip 13 is generally not suitable for use with behind-the-wall (BTW) connectors, where space is at a minimum.

Figure 2:
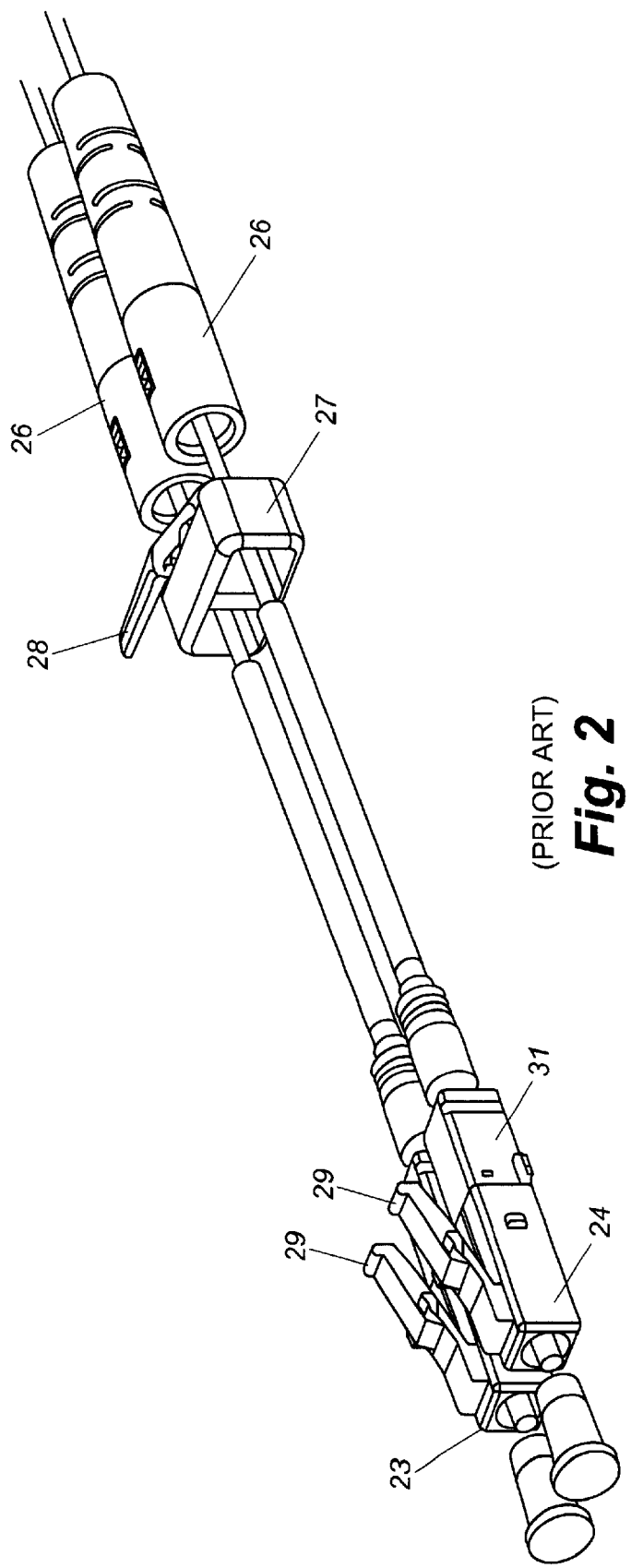
FIG. 2 is a partially exploded perspective view of another arrangement for connecting a pair of simplex connectors to a duplex connector.

FIG. 2 illustrates another prior art duplex connector arrangement comprising two simplex connectors 23 and 24 which are clipped together to form a duplex connector by a yoke 27 which has a trigger 28 for actuating latching arms 29 and having boots 26. Both the triggers 20 and 28 provide the anti-snag protection that is desired.

The housing of connectors 23 and 24 require back portions 31, as do connectors 11 and 12 of the FIG. 1 arrangement which contain metal inserts for side loading capability which is a desideratum for front side connectors, as the connectors of FIGS. 1 and 2 are. However, such arrangements as shown in FIGS. 1 and 2 are not suitable for BTW mounting. For BTW mounting, metal inserts are not required, hence the back portion 31 of the connector body can be replaced by an extender cap which makes the connector substantially shorter.

Figure 3:
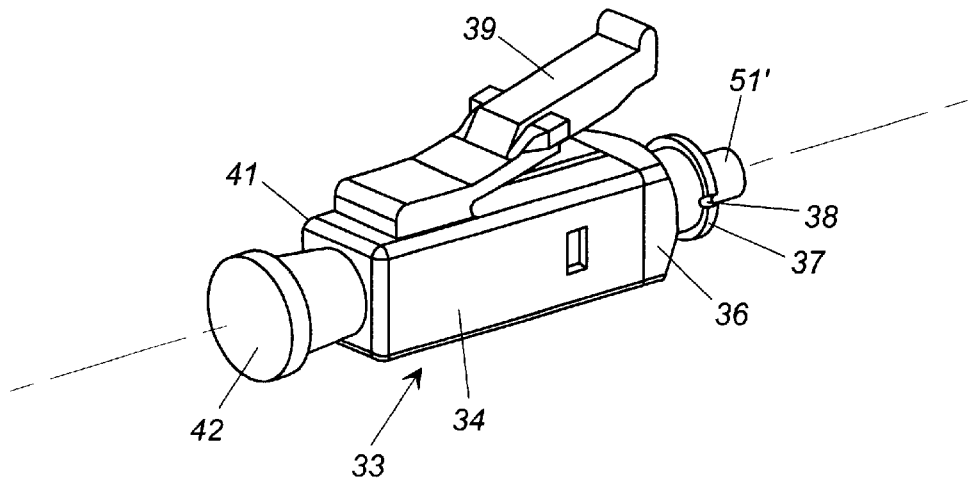
FIG. 3 is a perspective view of a simplex BTW (behind-the-wall) connector with which the present invention is used.

In FIG. 3 there is shown a connector 33 suitable for BTW use, which comprises a body portion 34 having an extender cap 36 which has a short flanged portion 37 extending therefrom. Flanged portion 37 has key slots 38 therein (best seen in FIG. 5) which provide for inspection of proper orientation of the extender cap 36 in the plug housing 34. Body portion 34 has a latching arm 39 extending at an angle therefrom which functions to latch connector 33 in place within an adapter (not shown) or other connector receiving member. The front portion 41 of body portion 34 has a fiber containing ferrule (not shown) extending therefrom which, as shown in FIG. 3, is protected by a protective plug 42, which is removed when a connection is to be made. The ferrule is extended by a barrel or tube 51' to facilitate installation of adhesives and the fiber. The overall length of connector 33 is substantially less than that of 11, 12, 23, and 24 shown in FIGS. 1 and 2, thereby making it more suitable as a BTW connector.

Figure 4A:
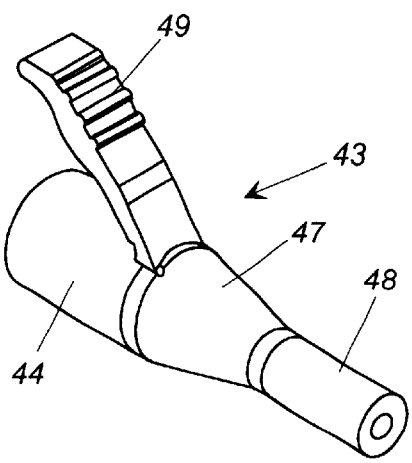
FIGS. 4a through 4c are perspective views of the boot of the invention for use with the connector of FIG. 3.
Figure 4B:
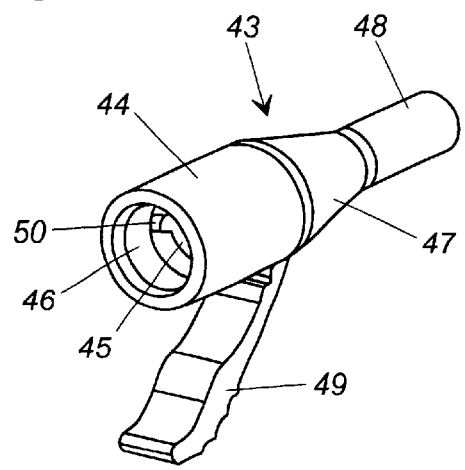
Figure 4C:
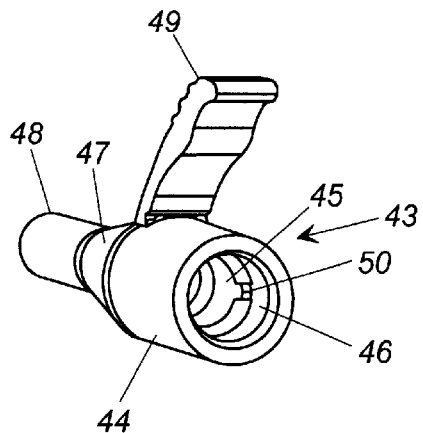
Figure 5:
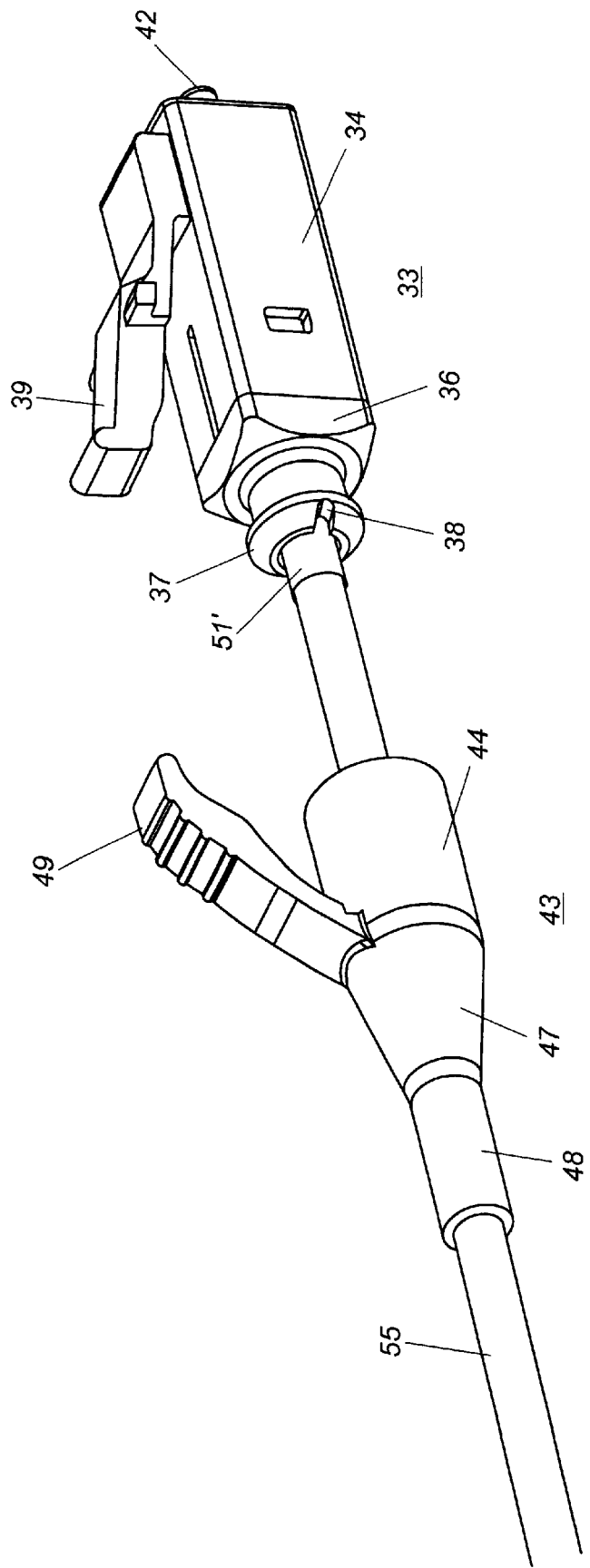
FIG. 5 is a partially exploded perspective view of the boot of FIGS. 4a through 4c and the connector of FIG. 3.
Figure 6:
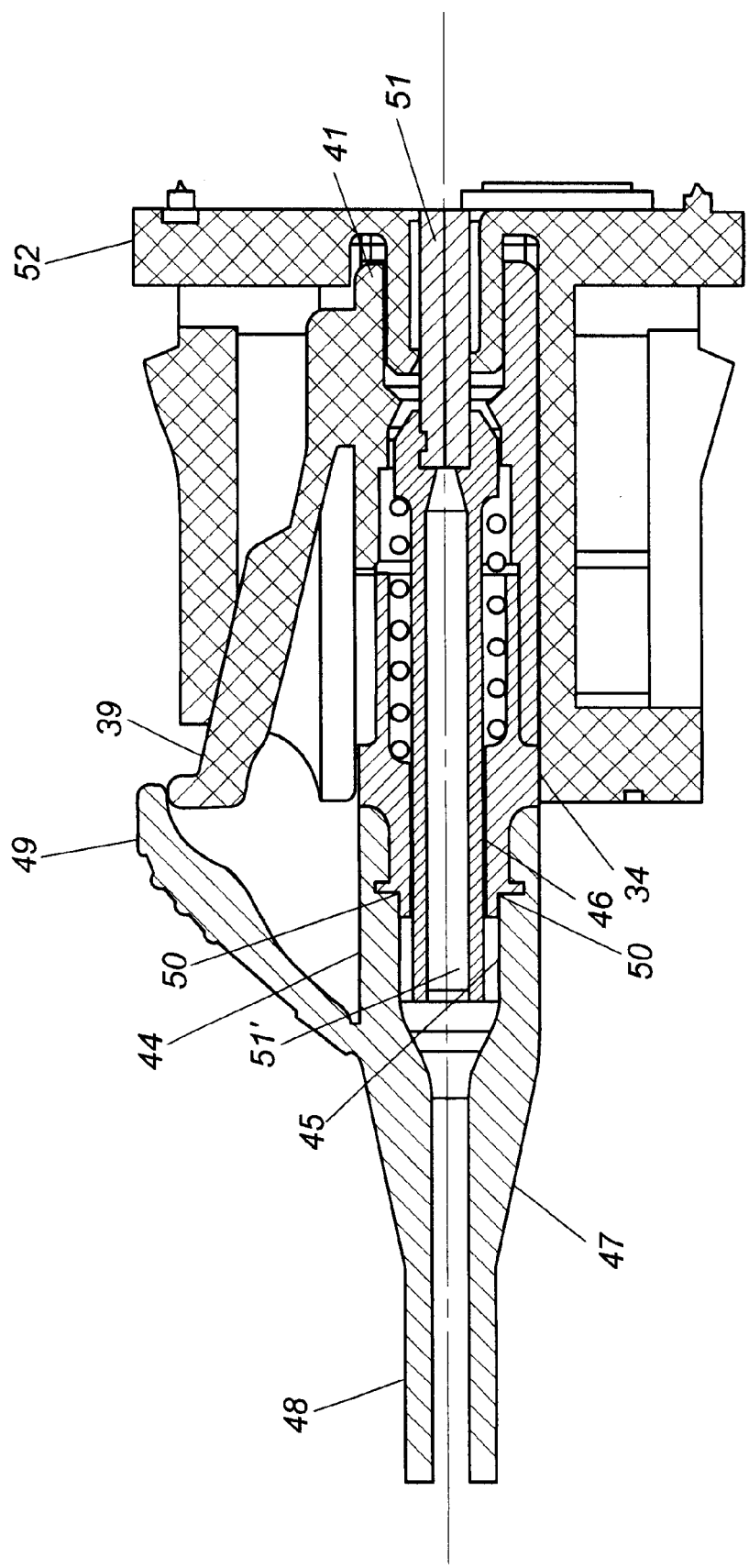
FIG. 6 is a cross sectional view of the assembled elements of FIG. 5 as mounted in a receptacle.
Figure 7B:
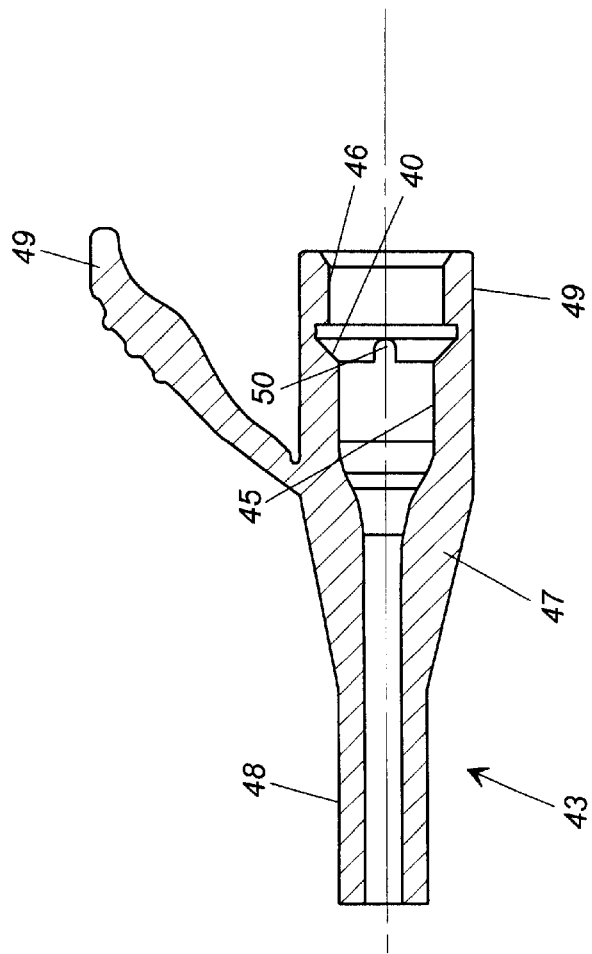
FIGS. 7a and 7b are an end view and a cross sectional view along the line I—I respectively of the boot of the invention.

As was pointed out in the foregoing, the abbreviated length of the BTW plug presents some difficulty in introducing an anti-snag or anti-fish hook arrangement inasmuch as there generally is not room for a trigger to be formed on the back end of connector 33, extender cap 36 being too short. In FIGS. 4a through 4c there are shown various views of the boot 43 of the present invention, which provides an anti-snag feature. Boot 43 comprises elongated body having a large diameter portion 44 having a bore 46 therein for fitting the boot 43 over the flanged portion 37 of extender cap 36, a tapered portion over section 47 which resists side pulling and ensures a minimum bend radius for the optical fiber, and a reduced diameter portion 48 through which the fiber passes and which protects the buffered fiber from kinking. Between bore 46 and a reduced diameter portion 45 is a circular tapered cavity 40, and there is created a shoulder from which a pair of keys 50 extend, toward the front or connector end of the boot as best seen in FIG. 7b. Boot 43 is preferably made from a suitable material, such as flexible PVC or TPR, which is resilient or flexible, but sufficiently stiff to resist heavy side loads. In order to create an anti-snag configuration, boot 43 has extending at an angle therefrom a cantilevered trigger 49, the use of which is more clearly shown in FIGS. 5 and 6. In FIG. 5, connector 33 and boot 43 are shown arrayed, but not connected to each other, on a buffered fiber 55. It is to be understood that other than buffered fiber may comprise member 55, which has been mounted in barrel assembly tube 51'. Generically, the term "cable" will be used hereinafter. Boot 43 is oriented relative to connector 33 such that, when they are connected, keys 50 fit within keyways 38. In addition, trigger 49 is oriented relative to keyways 38 such that its free end overlies the end of latching arm 39, as best seen in FIG. 6, thereby reducing the damages of snagging or fish hooking. In FIG. 6 the assembled connector-boot arrangement is shown mounted in a sectional view showing a receptacle or one-half of an adapter 52 (the alignment and other half of the adapter not shown). FIG. 6 also shows the location and orientation of the previously mentioned ferrule 51.

Figure 7A:
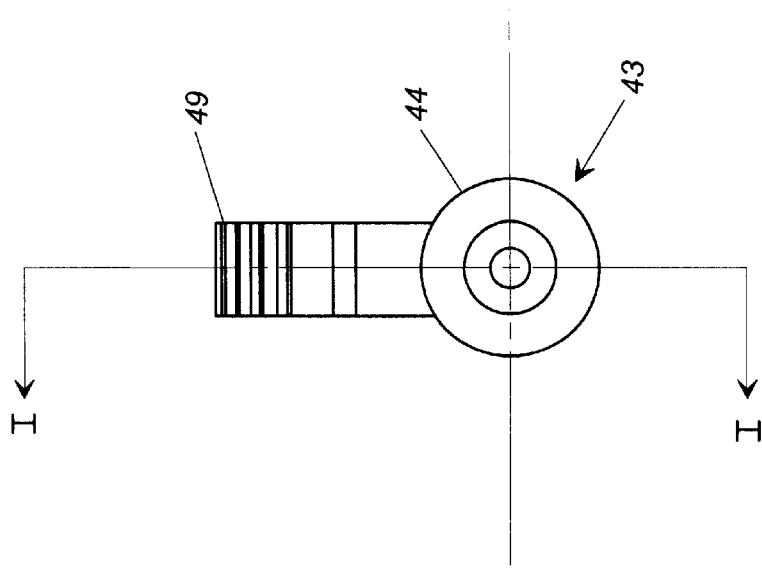

FIGS. 7a and 7b illustrate the configuration of the boot and illustrate the arrangement of the bores 45 and 46 and location of the keys 50. It can be seen that bore 46 has a beveled undercut cavity 40 into which flange portion 37 of extender cap 36 fits and is gripped thereby, as seen in FIG. 6.

From the foregoing it can be seen that the boot 43 of the invention in its simplex configuration provides anti-snag protection without requiring additional connector length as in the structures of FIGS. 1 and 2, and facilitates removal of the connector from the adapter and, additionally, in the case of the duplex connector, insures correct polarization of the optical fiber and prevention of rotation of the connector relative to the fiber axis.

Figure 8A:
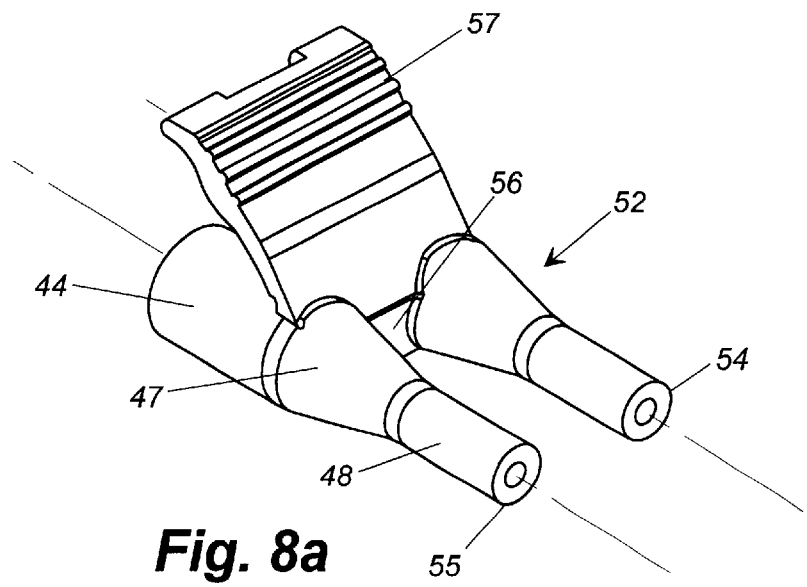
FIGS. 8a through 8d are several views of the boot of the invention and embodied in a duplex arrangement.
Figure 8B:
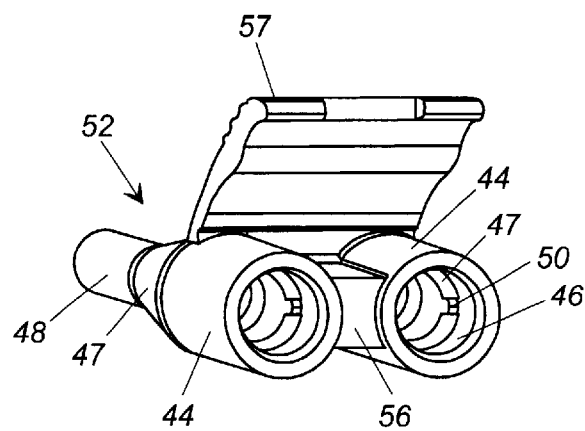
Figure 8C:
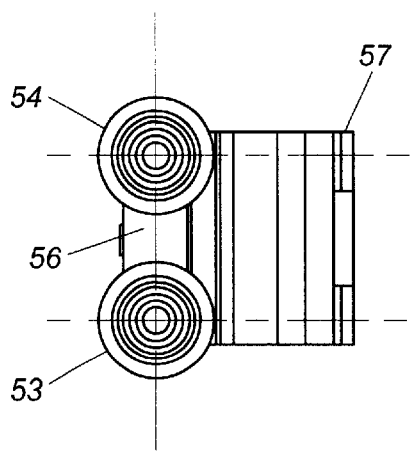
Figure 8D:
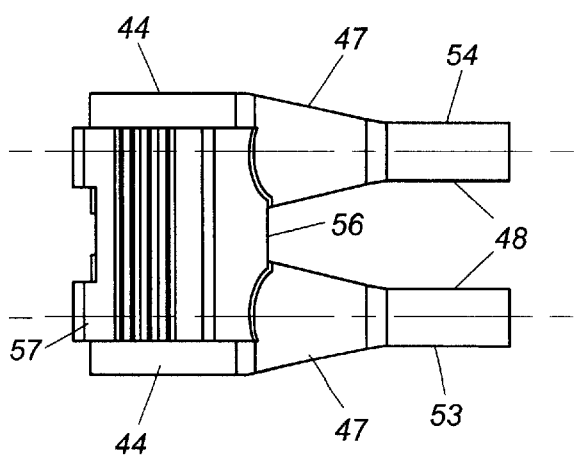

The principles of the invention as illustrated in the foregoing are readily adaptable to use in a duplex arrangement. In FIGS. 8a and 8b there is shown a duplex boot arrangement 52 wherein first and second boots 53 and 54 are joined together in spaced relationship by a web 56 which has extending therefrom a trigger member 57. Inasmuch as the individual boots 53 and 54 are substantially identical to the simplex boot 43 described in the foregoing, corresponding parts have been given the same reference numerals. The duplex structure 52 can be in the form of a unitary molded member, or web 57 and trigger 57 may be in the form of a clip mounted on the boots 53 and 54. FIGS. 8c and 8d are, respectively, an end view and a top plan view of the duplex connector arrangement. It is possible that more than a two connectors, i.e., duplex, assembly might be required in which case the arrangement of FIGS. 8a through 8d can be expanded to accommodate more than two connectors, preferably in a unitary form, but by means of clips if desired. It can be appreciated that, thus joined, the connectors and the boots will not rotate relative to each other, thus insuring correct polarization.

Figure 9:
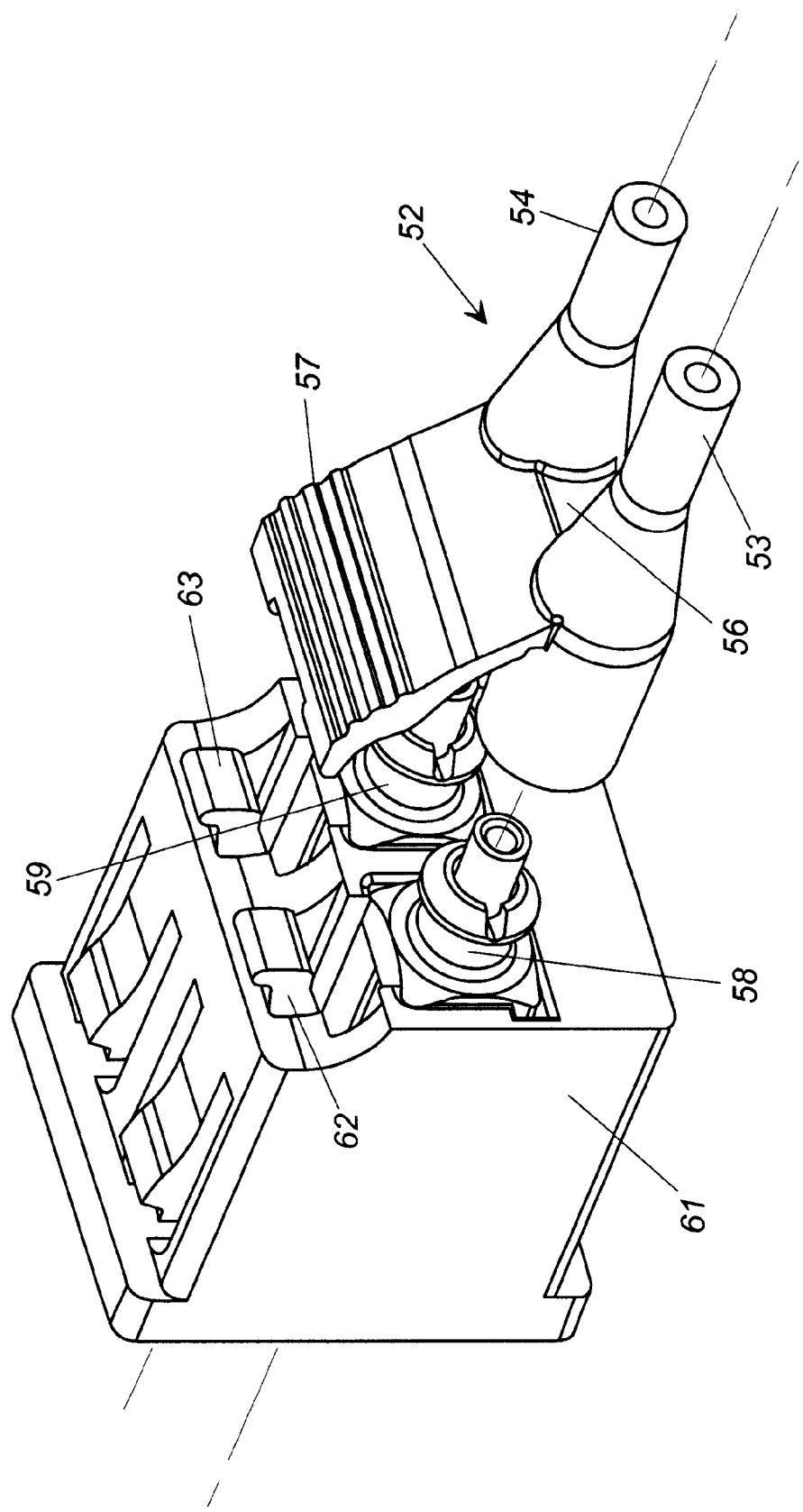
FIG. 9 is a partially exploded perspective view of the duplex combination of boot and connectors as mounted in a duplex receptacle or one side of a duplex adapter.

FIG. 9 illustrates, in perspective, the relationship of the duplex arrangement 52 of FIGS. 8a through 8c with a pair of BTW connectors 58 and 59 (buffered fibers not shown) mounted in a receptacle or half of an adapter 61. As was the case in the simplex arrangement, each connector 58 and 59 has a latching arm 62 and 63, respectively which are adapted to be actuated by trigger 57, the free end of which overlies them (see FIG. 6). The numerous advantages listed in the discussion of the simplex arrangement are also realized in the duplex (or greater) arrangement.

It is to be understood that the various features of the present invention are amenable to inclusion in other connector-boot arrangements, and that other modifications or adaptations might occur to those skilled in the art. All such variations, modifications, or adaptations are intended to be included herein as being within the scope of the present invention as set forth in the claims. Further, in the claims hereafter, the corresponding structures, materials, acts, and equivalents of all means or step plus function elements are intended to include any structure, material, or acts for performing the functions in combination with other elements as specifically claimed.

We claim:

1. For use with a connector having an elongated body portion, a front end having a latch, and a rear end having a flanged extender cap extending therefrom a boot comprising:

an elongated body having a front end and a rear end and a first bore of a first diameter extending through a first portion thereof from said front-end, a second bore extending from said first bore and having a second diameter less than said first diameter thereby creating a shoulder portion between the two bores having a configuration for preventing rotation of the boot relative to the connector;

a third portion having a third diameter less than said first and second diameters extending from said second bore to said rear end, thereby creating a through passage for an optical fiber cable; and said first portion having a trigger member extending at an angle relative to said body toward said front end to interact with the latch.

2. A boot as claimed in claim 1 wherein said first bore has an undercut portion for gripping the flange of the flanged extender cap.

3. A boot as claimed in claim 1 wherein said boot is made of a resilient material.

4. A connector boot comprising an elongated body having a bore extending therethrough for receiving an optical fiber cable, said boot being adapted to be mounted on a BTW connector;

said boot having extending therefrom a trigger member, said trigger member being integral with said boot, thereby forming a unitary one-piece structure.

5. A connector boot as claimed in claim 4 wherein said bore has a first diameter portion, a second diameter portion of smaller diameter than said first diameter portion, thereby forming a shoulder between said first and said second diameter portions and at least one key extending from said shoulder.

6. A connector boot as claimed in claim 4 wherein said first diameter portion has an undercut portion for receiving the flange of the connector to which said boot is to be attached.

7. For use with a connector having an elongated body portion, a front end having a latch, and a rear end having a flanged extender cap extending therefrom, a boot comprising:
  an elongated body having a front end and a rear end and a first bore of a first diameter extending through a first portion thereof from said front end, a second bore extending from said first bore and having a second diameter less than said first diameter thereby creating a shoulder portion between the two bores;
  a third bore having a third diameter less than said first and second diameter extending from said second bore to said rear end, thereby creating a through passage for an optical fiber cable;
  said first portion having a trigger member extending at an angle relative to said body toward said front end to interact with said latch; and
  further comprising a second boot mounted to and spaced from said boot by a web; and
  said trigger member extends at an angle from said web toward said front end.

8. A boot as claimed in claim 7 wherein said second boot is substantially identical to said boot.

9. A boot as claimed in claim 8 wherein said boot and said second boot and said web are integral with each other thereby forming a unitary structure.

10. A connector boot assembly comprising first and second boots joined by and spaced from each other by a web integral with said first and second boots, thereby forming a unitary one-piece structure.

11. For use with a connector having an elongated body portion, a front end having a latch, and a rear end having a flanged extender cap extending therefrom, a boot comprising:
  an elongated body having a front end and a rear end and a first bore of a first diameter extending through a first portion thereof from said front end, a second bore extending from said first bore and having a second diameter less than said first diameter thereby creating a shoulder portion between the two bores;
  a third bore having a third diameter less than said first and second diameter extending from said second bore to said rear end, thereby creating a through passage for an optical fiber cable;
  said first portion having a trigger member extending at an angle relative to said body toward said front end to interact with said latch; and
  wherein the connector has keyways on the flanged extender cap, and said boot has at least one key extending from said shoulder portion toward said front end and adapted to mate with a keyway in the flange when said boot is mounted thereon.

12. A connector boot assembly comprising first and second boots joined by and spaced from each other by a web integral with said first and second boots;
  wherein said first and second boots have parallel axes, and further including a trigger member extending from said web at an angle to said axes.

* * * * *